(12) United States Patent
Fux et al.

(10) Patent No.: US 7,228,267 B2
(45) Date of Patent: Jun. 5, 2007

(54) METHOD AND SYSTEM OF CREATING AND USING CHINESE LANGUAGE DATA AND USER-CORRECTED DATA

(75) Inventors: Vadim Fux, Waterloo (CA); Sergey V. Kolomiets, Waterloo (CA)

(73) Assignee: 2012244 Ontario Inc., Waterloo (CA)

( * ) Notice: Subject to any disclaimer, the term of this patent is extended or adjusted under 35 U.S.C. 154(b) by 931 days.

(21) Appl. No.: 10/305,563

(22) Filed: Nov. 27, 2002

(65) Prior Publication Data

US 2004/0006458 A1    Jan. 8, 2004

Related U.S. Application Data

(60) Provisional application No. 60/393,948, filed on Jul. 3, 2002.

(51) Int. Cl.
*G06F 17/28* (2006.01)
*G06F 17/22* (2006.01)

(52) U.S. Cl. .................. 704/3; 704/7; 704/10

(58) Field of Classification Search ............ None
See application file for complete search history.

(56) References Cited

U.S. PATENT DOCUMENTS 5,270,927 A * 12/1993 Sproat ................. 715/535
5,319,552 A * 6/1994 Zhong ................. 715/535
6,073,146 A    6/2000 Chen
6,848,080 B1 * 1/2005 Lee et al. .............. 715/533

FOREIGN PATENT DOCUMENTS

| EP | 1 085 401 A1 | 3/2001 |
|---|---|---|
| JP | 05-216887 | 8/1993 |
| JP | 06-259465 | 9/1994 |
| JP | 09-006761 | 1/1997 |

\* cited by examiner

*Primary Examiner*—V. Paul Harper
(74) *Attorney, Agent, or Firm*—Jones Day; Krishna K. Pathiyal; Robert C. Liang (57) ABSTRACT

Unique identifiers for each of a plurality of Chinese Pinyin syllables are generated and stored in an array of identifiers. A plurality of Hanzi character candidate lists is also generated, each list including Hanzi character candidates associated with a Pinyin syllable. Each identifier in the array has an array index, and each Hanzi character candidate in each list has a candidate index in the list. For each of a plurality of words having multiple Pinyin syllables, a data record including a key and a value is then generated. In a data record for a word, the key is an array index of the identifier in the array of identifiers and tone information for each of the multiple Pinyin syllables of the word, and the value is a candidate index, in the list of candidates associated with each of the Pinyin syllables, of the candidate that represents each of the Pinyin syllables.

17 Claims, 6 Drawing Sheets

METHOD AND SYSTEM OF CREATING AND USING CHINESE LANGUAGE DATA AND USER-CORRECTED DATA

CROSS-REFERENCE TO RELATED APPLICATION

This application claims priority from U.S. Provisional Application Ser. No. 60/393,948, filed on Jul. 3, 2002. The complete disclosure of this provisional application, including drawings, is hereby incorporated into this application by reference.

BACKGROUND OF THE INVENTION

1. Field of the Invention

The present invention relates generally to language data storage and text input on electronic devices, and in particular to creation and usage of Chinese language data for the purposes of text processing and text input.

2. Description of the State of the Art

In Mandarin Chinese, every character is spoken in a mono syllabic manner. Mandarin Chinese contains over 10,000 characters that are comprised of variations of 405 base "Pinyin" characters and 5 tones. The syllabary principle is the basis for Chinese writing systems such as Hung and Tzeng, where many syllables can represent the same sound, and the same sounds are often represented by many different symbols. In addition, words are not separated by spaces in Chinese language, requiring Chinese linguistic data for proper segmentation of words during Chinese text input on electronic devices. Research reveals that static linguistic data is not sufficient to provide proper word segmentation in most cases. Only systems with learning of user input patterns provide a level of segmentation accuracy for efficient Chinese text input. Thus, extensive linguistic data is required, accounting for the very high memory usage by most Chinese text input systems.

Existing solutions for storage and use of linguistic data for purposes of text input employ such data structures as hash tables, trees, databases or word lists. These solutions are not feasible in many modern systems, in that they require significant memory and code space to store and support the complex data structures they rely upon, and consume a large amount of processing resources. Electronic devices such as portable electronic devices, including mobile communication devices, for example, have limited processing and memory resources which preclude the use of these existing solutions.

SUMMARY

According to an embodiment of the invention, a language data structure for use in converting Chinese Pinyin syllables into Chinese Hanzi characters comprises a plurality of Hanzi character candidate lists, each list comprising Hanzi character candidates associated with a Pinyin syllable, and each Hanzi character candidate in each list having an index in the list, and a plurality of language data records, each language data record corresponding to a word having a plurality of Pinyin syllables and comprising a key and a value, wherein the key in each language data record comprises a sequence of indexes and tone information for the Pinyin syllables of the word to which the language data record corresponds, and wherein the value in each language data record comprises a sequence of indexes of Hanzi character candidates, in the lists of candidates respectively associated with the Pinyin syllables of the word, that represent the Pinyin syllables of the word.

A method of creating Chinese language data according to another embodiment of the invention comprises the steps of generating identifiers for each of a plurality of Chinese Pinyin syllables, storing the generated identifiers in an array of identifiers, each identifier in the array of identifiers having an array index, generating a plurality of Hanzi character candidate lists, each list comprising Hanzi character candidates associated with a Pinyin syllable, and each Hanzi character candidate in each list having a candidate index in the list, and for each of a plurality of words having multiple Pinyin syllables, generating a data record comprising a key and a value, wherein the key comprises an array index of the identifier in the array of identifiers for each of the multiple Pinyin syllables and tone information for each of the multiple Pinyin syllables, and wherein the value comprises a candidate index, in the list of candidates associated with each of the multiple Pinyin syllables, of the candidate that represents each of the multiple Pinyin syllables.

In accordance with a further embodiment of the invention, a system of using Chinese language data for converting Chinese Pinyin syllables into Chinese Hanzi characters is provided. The language data includes a plurality of Hanzi character candidate lists, each list comprising Hanzi character candidates associated with a Pinyin syllable, and each Hanzi character candidate in each list having an index in the list, and a plurality of language data records, each language data record corresponding to a word having a plurality of Pinyin syllables and comprising a key and a value. The key in each language data record comprises a sequence of indexes and tone information for the Pinyin syllables of the word to which the language data record corresponds and the value in each language data record comprises a sequence of indexes of Hanzi character candidates, in the lists of candidates respectively associated with the Pinyin syllables of the word, that represent the Pinyin syllables of the word. The system comprises a keyboard having keys representing a plurality of characters for composing Pinyin syllables, an input queue configured to receive input Pinyin syllable from the keyboard, a memory configured to store the plurality of Hanzi character candidate lists and the plurality of data records, an input processor operatively coupled to the memory and the input queue and configured to segment the input Pinyin syllables into input words, to search the language data records for language data records respectively corresponding to each input word including the input Pinyin syllables, and to convert each input word into the Chinese Hanzi character candidates using the Hanzi character candidate indexes in the corresponding data record, a display, and a user interface coupled between the display and the input processor to display the input Pinyin syllables on the display and to replace the input Pinyin syllables with the Chinese Hanzi character candidates when the input Pinyin syllables are converted by the input processor.

Further features of the invention will be described or will become apparent in the course of the following detailed description.

DETAILED DESCRIPTION

According to one aspect of the invention, a system and method of creation and use of language data is based on Chinese syllable and character indexing. Indexing enables language data storage with less memory use and faster searching of and access to words relative to known Chinese text input techniques.

There are 410 syllables (sounds) in the Pinyin system (1981), including 405 base Pinyin characters and 5 tones, that can be used for Chinese input. Pinyin syllables are constructed from the 26 characters of the Latin alphabet, and are therefore commonly used for Chinese text entry on keyboards in which Latin characters are represented. Each of the 26 characters of the Latin alphabet can be assigned an index value of between 0 and 25, indicating its position in the alphabet. For example, the letter "A" is at index 0, "B" is at index 1, and so on, with "Z" at index 25.

Alternatively, the 410 Chinese syllables can also be constructed from the 37 "Bopomofo" characters. These characters reside in a contiguous Unicode range, 0x3105 through 0x3129, and as such can also be indexed by decimal numbers 0 through 36. The index of 0 corresponds to the first character in the Unicode range, 0x3105, the index of 1 corresponds to the second character in the Unicode range, 0x3106, and so on.

Using the above indexes, each Pinyin and Bopomofo syllable may thus be represented by a unique identification number. According to an embodiment of the invention, a unique identification number for any (n+1)-character syllable is calculated using the following formula:

$$ID = index_0 *(N^0) + index_1 *(N^1) + \ldots + index_n *(N^n)$$

where:
index$_0$ is the index of the first character in the syllable,
index$_1$ is the index of the second character in the syllable,
index$_n$ is the index of the (n+1)th character in the syllable, and
N is the highest index of the characters used for syllable construction.

For example, in the Bopomofo syllable "ㄌㄧㄠ", the index of the first character ㄌ, which has a Unicode number 0x310C, is 0x310C minus the Unicode number of the first Bopomofo character, 0x3105. Thus, index$_0$=0x310C−0x3105=7. Similarly, index$_1$ is the index of the second character "ㄧ", which is 0x3127−0x3105=0x0022=34, and index$_2$ is the index of the third character "ㄠ", which is 0x3120−0x3105=0x001B=27. Since the highest index for a Bopomofo character is 36, N=36 for Bopomofo syllable identifiers. Therefore, the identifier for this syllable, according to the above formula, is:

$$ID = 7*(36^0) + 34*(36^1) + 27*(36^2) = 7 + 1224 + 34992 = 36223.$$

Unique identification numbers can similarly be calculated for each of the Pinyin syllables, with index$_n$ being between 0 and 25, and N=25.

The above formula allows a unique identifier to be assigned to each Pinyin and Bopomofo syllable. The Pinyin and Bopomofo syllables are then stored in respective arrays, sorted according to unique identifier.

Figure 1:
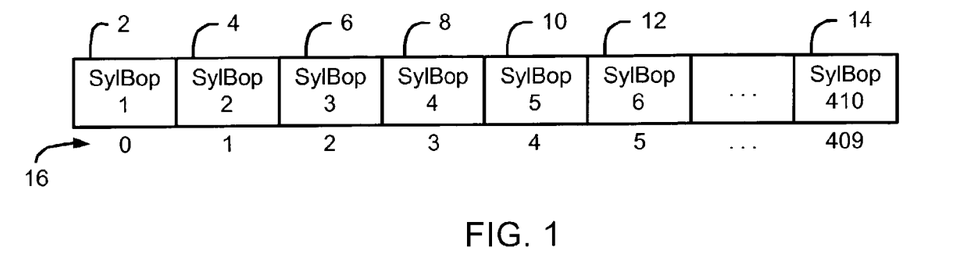
FIG. 1 shows an array of unique identifiers for Bopomofo syllables.

FIG. 1 shows an array of unique identifiers for Bopomofo syllables. The array of FIG. 1 shows the unique identifiers 2, 4, 6, 8, 10, 12, and 14, representing the first 6 identifiers and the last (410$^{th}$) identifier. The identifiers 2 though 14, and intervening identifiers between SylBop 6 and SylBop 410, are preferably sorted in increasing order, such that SylBop 1 is the lowest identifier, and SylBop 410 is the highest identifier. Array indexes, ranging from 0 to 409, are also shown in FIG. 1 at 16.

Figure 2:
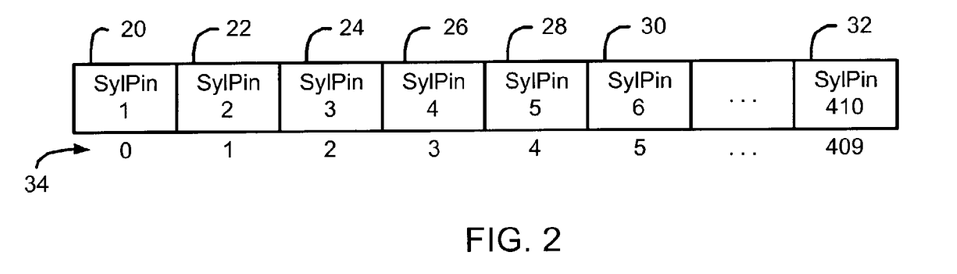
FIG. 2 shows an array of unique identifiers for Pinyin syllables.

FIG. 2 shows an array of unique identifiers for Pinyin syllables. The first 6 Pinyin syllable identifiers 20, 22, 24, 26, 28, and 30, and the last identifier 32, are representative of the 410 unique identifiers in the Pinyin symbol identifier array. Indexes 34 for the Pinyin syllable identifier array, like the indexes 16, range from 0 to 409.

As shown in FIGS. 1 and 2, the identifiers for the Bopomofo and Pinyin syllables reside in different arrays. It will also be apparent to those skilled in the art that these identifiers do not have a strict correspondence by index. The identifiers SylBop a at index a-1 in the array of Bopomofo syllable identifiers and SylPin a at index a-1 in the array of Pinyin syllable identifiers do not necessarily identify a Bopomofo syllable and its corresponding Pinyin syllable counterpart. There is, therefore, an additional array containing information on the correspondence between "Bopomofo" and Pinyin syllables.

Figure 3:
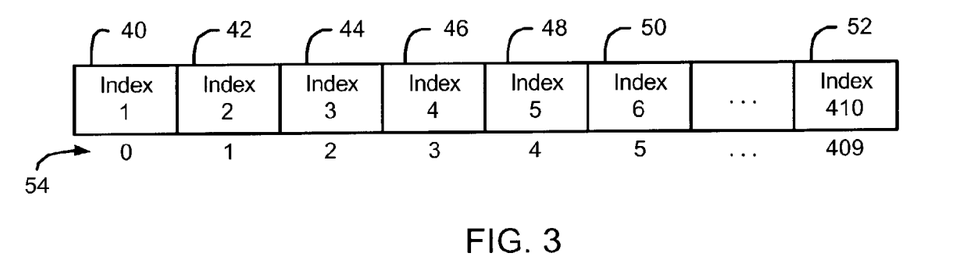
FIG. 3 shows an array of correspondences between Pinyin syllables and Bopomofo syllables.

FIG. 3 shows an array of correspondences between Pinyin syllables and Bopomofo syllables. Elements 40–50 and 52, as well as intervening array elements between elements 50 and 52, in the correspondence array are indexes to either the Pinyin identifier array or the Bopomofo identifier array. The indexes 54 to the correspondence array correspond to indexes to the other of the Pinyin identifier array and the Bopomofo identifier array. For example, where the indexes 54 to the correspondence array correspond to the indexes 34 of the Pinyin identifier array, elements of the correspondence array are indexes 16 to the Bopomofo identifier array. In this case, the array element Index b, at index b-1 in the correspondence array, is the index of the Bopomofo identifier array of the Bopomofo identifier for the Bopomofo syllable corresponding to the Pinyin syllable having the identifier at index b-1 in the Pinyin identifier array. In other words, the Pinyin syllable identified by SylPin(b-1) corresponds to the Bopomofo syllable identified by SylBop(Index b). Thus, the correspondence array provides the index of the Bopomofo identifier corresponding to a Pinyin identifier. It should be apparent that in the correspondence array, indexes 54 may instead correspond to the Bopomofo identifier array indexes 16, with the elements then storing Pinyin identifier array indexes.

Figure 4:
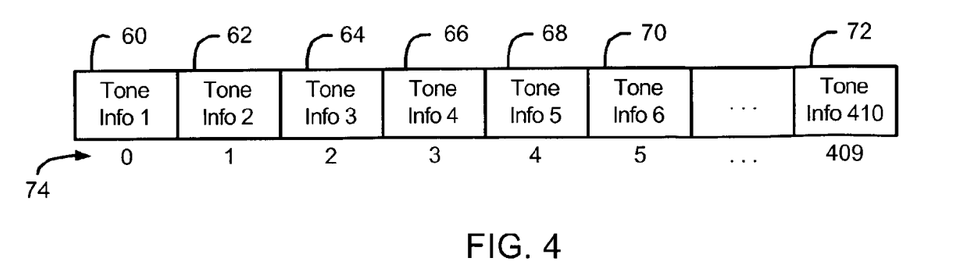
FIG. 4 shows a tone information array.

FIG. 4 shows a tone information array. The tone information array is a further array of bytes that consists of 410 elements, having indexes 0 through 409. The tone information array includes elements 60–70, intervening elements not explicitly shown in FIG. 4, and element 72. This array contains tone information for all 410 Bopomofo syllables and has strict correspondence with the array of "Bopomofo" syllables. The tone information element Tone Info c, at index c-1, corresponds to the Bopomofo syllable identifier SylBop c, at the same index c-1 of the Bopomofo identifier array. The first five bits in each byte of the tone information array show whether the Bopomofo syllable identified at the same index of the Bopomofo identifier array can be used with any of the 5 Chinese language tones.

Every Pinyin and Bopomofo syllable has several corresponding Chinese "Hanzi" characters, forming a list of "candidates", which are stored in respective corresponding arrays for each Pinyin and Bopomofo syllable using 2-byte values. Each "candidate" in such an array has a unique index in the array. Thus, every Chinese word may be represented by a sequence of the indexes of its syllables and the indexes of the corresponding Chinese Hanzi characters of which the word is constructed.

Figure 5:
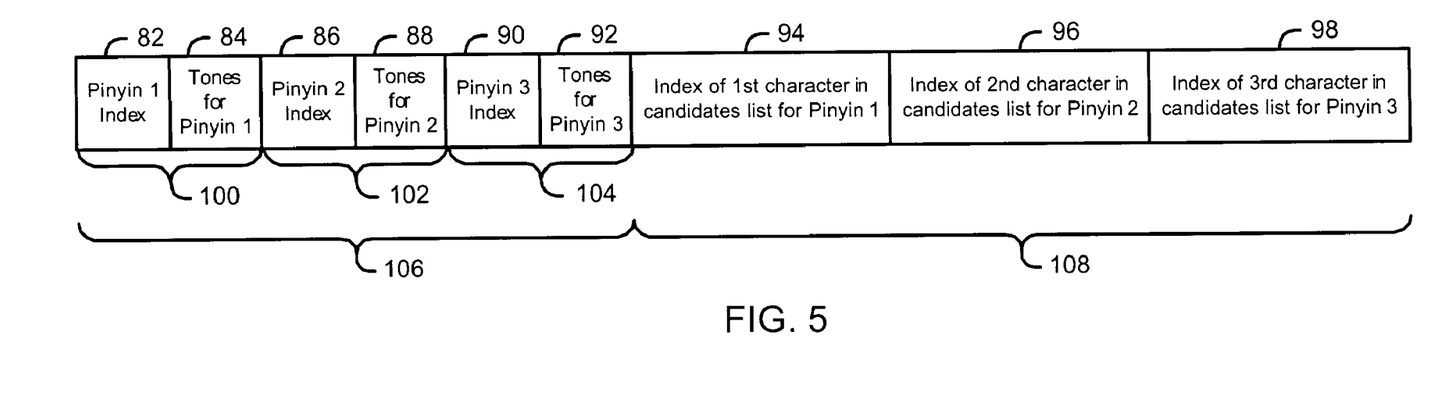
FIG. 5 is a block diagram showing a format of a language data record for a multiple-character word.

In an embodiment of the invention, language data includes records for Chinese words ranging in length from 2 to 8 syllables, organized in separate arrays, where records for words with the same length reside in the same array without delimiters. FIG. 5 is a block diagram showing a format of a language data record for a multiple-character word.

The record in FIG. 5 corresponds to a multiple-character word having 3 syllables, including Pinyin 1, Pinyin 2, and Pinyin 3. For each Pinyin syllable in the word, the index of the syllable and an indication of the tones that may be used with the syllable are stored in the record. The syllable indexes, which correspond to the indexes of the syllables in the Pinyin array of FIG. 2, are shown at 82, 86, and 90, and the tones are shown at 84, 88, and 92. The index and tone information form entries 100, 102, and 104 for each syllable.

As described above, a list of candidates of Hanzi characters is stored in a corresponding array for each Pinyin and Bopomofo syllable. The indexes 94, 96, and 98 are indexes, in the list of candidates, of Hanzi characters that represent the Pinyin syllables. The index 94 is the index, in the list of candidates for Pinyin 1, of the first Hanzi character in the word corresponding to the record in FIG. 5. Similarly, the indexes 96 and 98 are the indexes, in the lists of candidates for Pinyin 2 and Pinyin 3, of the second and third Hanzi characters, respectively, in the word corresponding to the record in FIG. 5.

A language data record for a word thus includes a key 106 and a value 108, where the key 106 is a sequence of indexes and tone information 100, 102, and 104 for syllables that represents the word and the value 108 is a sequence of indexes of Hanzi characters 94, 96, and 98 that represents the syllables. In order to facilitate efficient searching of language data, records are preferably sorted by the index of the first syllable.

Figure 6:
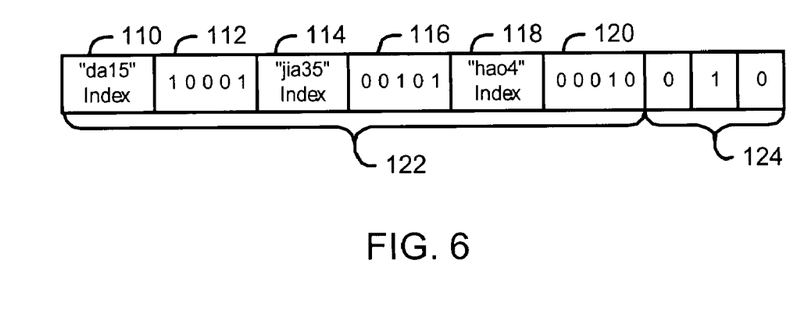
FIG. 6 is a block diagram of an example language data record.

FIG. 6 is a block diagram of an example language data record. The language data record in FIG. 6 has the format shown in FIG. 5, including a sequence of Pinyin syllable indexes 110, 114, and 118, and tone information 112, 116, and 120, as a key 122, and a value 124 representing a sequence of Chinese character indexes.

The Pinyin index 110 is the index of the Pinyin identifier in the Pinyin identifier array of the Pinyin "da15". The "15" in "da15" represents the first and fifth tones. Those familiar with Pinyin syllables will appreciate that the first tone is the high level tone, the second tone is the rising tone, the third tone is the low level tone, the fourth tone is the falling tone, and the fifth tone is the neutral tone. Each tone is preferably associated with a bit position in a 5-bit tone information entry in a language data record. Each valid tone for a Pinyin character is indicated by setting a bit in a corresponding position of the tone information entry to a predetermined value. In the tone information entry 112, the tones first and fifth tones are indicated by the high bit value in the first and fifth bit positions. Alternatively, the predetermined bit value may be low. The other index and tone information entries 114/116 and 118/120 in FIG. 6 are similarly formatted.

The minimum length of a language data record is dependent upon minimum lengths of the indexes in a data record. As described above, there are 410 Pinyin syllables, which establishes a minimum length of 9 bits for each Pinyin index. Tone information entries preferably include 1 bit per tone, or 5 bits per entry. Although each candidates list index in the value 124 is shown as a single bit, it will be appreciated that the length of each candidates list index is dependent upon the number of candidates in a candidates list. Since variable-length indexes typically require delimiters between indexes or relatively complex management techniques, fixed-length indexes are generally preferred. Therefore, the length of all candidates list indexes is preferably dependent upon the number of candidates in the longest candidates list.

As those skilled in the art will appreciate, most memory components support access to byte-wide memory segments. Therefore, language data records are preferably formatted to occupy a number of whole bytes. For example, each index and tone information pair in a language data entry may be stored as a two-byte entry, in which at least the first byte and the first bit of the second byte (i.e., at least 9 bits) store the index, and the last 5 bits store the tone information. Similarly, byte-wide candidate list indexes form a 3-byte record value 124, and support up to 256 candidates in any of the candidate lists. With this type of byte assignment, the data record in FIG. 6 comprises a 6-byte key 122 and a 3-byte value 124.

Figure 7:
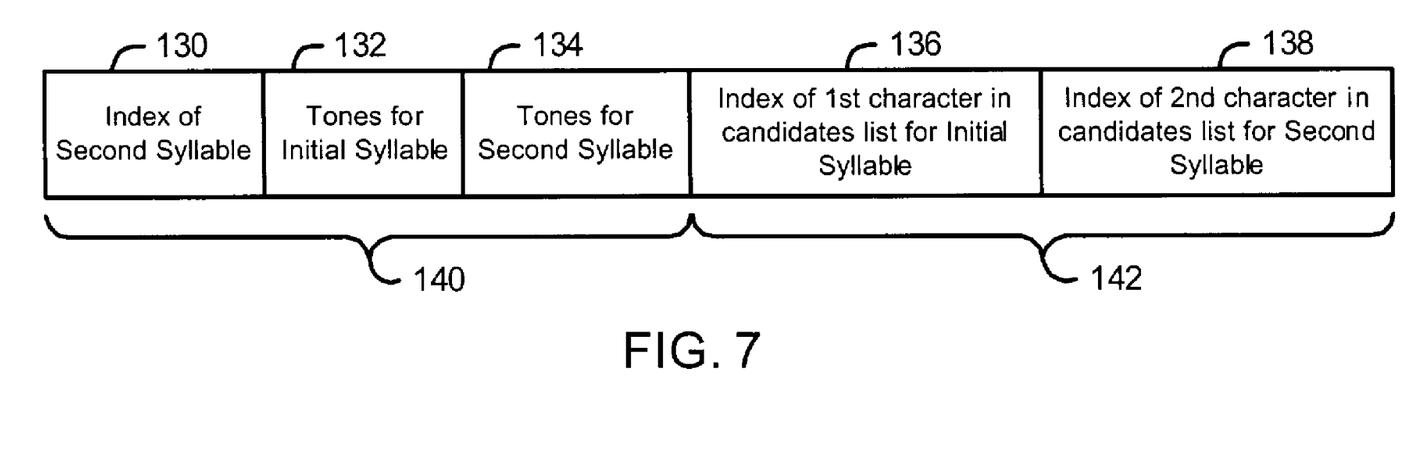
FIG. 7 is a block diagram showing a format of a language data record for a two-character word.

To further compact the language data, two-character words are preferably stored in a dedicated format. Since the majority of Chinese words are two-character words, space savings for records associated with two-character words results in a significant reduction in overall memory space requirements. FIG. 7 is a block diagram showing a format of a language data record for a two-character word.

As mentioned above, there are only 410 Pinyin syllables used in Chinese text. Every syllable that can be an initial syllable has its own pairs, each pair including an initial syllable plus a variant. Variants for each initial syllable are the syllables which may follow the initial syllable. For this reason, it is not necessary to store an initial syllable in each pair for a particular initial syllable, as it is always the same.

Moreover, indexes of initial syllables are compatible with the indexes of an array of offsets, so initial syllables need not be stored at all—their indexes are the same as the indexes of an array of offsets. The array of offsets is an array in which, at each index corresponding to a particular initial syllable, an offset in an array of data records for two-character words where an index of the first variant for this initial syllable is stored. For example, the first offset in the array of offsets is the offset of the first variant for a first initial syllable, which is 0 for the first initial syllable. In a preferred embodiment, initial syllables are ordered according to unique identifier or index in an array of identifiers, such that the first initial syllable is the initial syllable having the lowest, or, alternatively, the highest, unique identifier. Where there are 2 variants for the first initial syllable, the second offset in the array of offsets, corresponding to the first variant for the second initial syllable, is 2, since the first variant for the second initial syllable is offset from the first record by 2. Alternatively, the array of offsets could specify indexes of first variants for each corresponding initial syllable in the array of data records.

Each two-character word preferably has the format shown in FIG. 7, which is a block diagram showing a format of a language data record for a two-character word. The record in FIG. 7 includes the index of the second syllable 130, tone information 132 and 134 for the initial and second syllables, and indexes 136 and 138 of the respective Chinese characters that represent the initial and second syllables. Indexes and tone information have been described above.

In a language data record for a two-character word, the key 140 includes the index 130 for the second syllable and tone information 132 and 134 for both syllables. Like the language data records shown in FIGS. 5 and 6, the value 142 includes a sequence of indexes of Chinese characters 136 and 138. As described above, data records for variants of the same initial syllable are grouped together so that variants for an initial syllable can be found using an array of offsets. Data records for variants of the same initial syllable may also be sorted by the index 130 of the first syllable.

Figure 8:
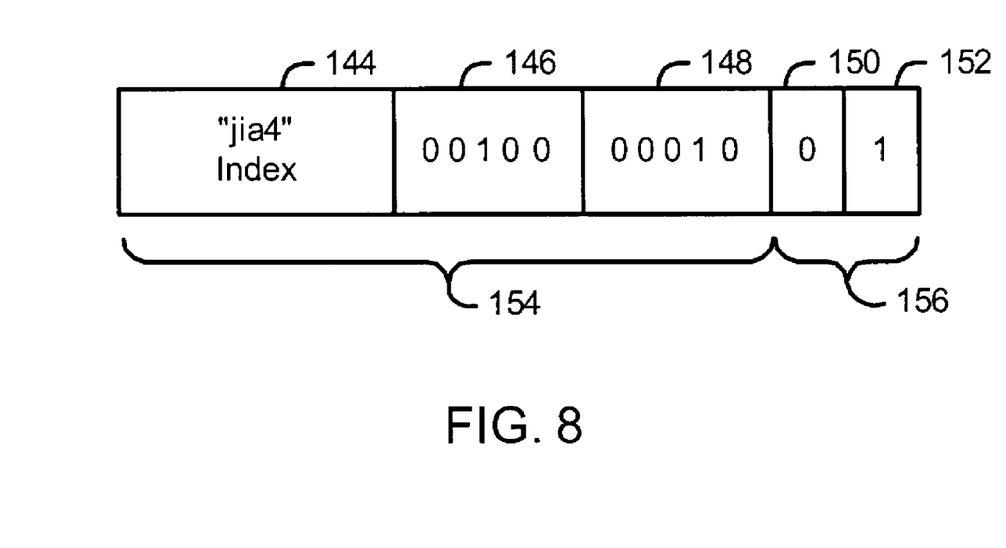
FIG. 8 is a block diagram showing an example language data record for a two-character word.

FIG. 8 is a block diagram showing an example language data record for a two-character word. The language data record of FIG. 8 is in the dedicated format shown in FIG. 7, and corresponds to the two-syllable word "da3" "jia4". The data record includes a key 154 and a value 156. The key 154 include the index 144 of only the second syllable "jia4", and tone information 146 and 148 for the first and second syllables. Following the key 154, the value 156 includes Hanzi character indexes in the candidate lists for the first and second syllables.

As described above, the minimum length of a syllable index is 9 bits, tone information entries include 1 bit per tone, or 5 bits per entry, and the length of each candidates list index is dependent upon the number of candidates in a candidates list, with fixed-length indexes dependent upon the number of candidates in the longest candidates list generally being preferred. Therefore, the index 144 is at least 9 bits in length, the tone information entries 146 and 148 are 5 bits long, as shown, and although the indexes 150 and 152 are shown as having one-bit length, these indexes may be longer than one bit.

In order to provide whole-byte length two-character word language data records, the key 154 and value 156 are preferably formatted to occupy a number of whole bytes. Since the index 130 or 144 is at least 9 bytes in length, an index cannot be stored in a single byte. Each tone value 132, 134, 146, and 148 is preferably 5 bits in length, and thus occupies less than one byte. The key 140 or 154 may therefore be stored, for example, in three bytes, in which the index 130/144 is stored in at least the first byte and the first bit of the second byte, and the last 5 bits of each of the second and third bytes store tone information. Candidate list indexes having a length of one byte, forming a 2-byte record value 138 or 156 support up to 256 candidates in any candidate list. Although this formatting provides a whole-byte length data record, other data record lengths are also possible, as will be apparent to those skilled in the art.

Relative to the language data record format shown in FIG. 5, the dedicated format shown in FIG. 7 saves one syllable index per record. The record format of FIG. 5 includes an index of each syllable, whereas a first syllable index is not stored in the record format of FIG. 7. Although the record format of FIG. 7 is supported by the above array of offsets, the majority of words are two-character words, resulting in significant overall memory savings, which is especially important where memory resources are limited.

An electronic device is enabled for Chinese text input by installing Chinese language data on the device. Identifiers for each syllable are calculated, as described above, and used to generate the identifier arrays shown in FIGS. 1 and 2, the correspondence array in FIG. 3, and the tone information array shown in FIG. 4. Using the indexes in the identifier arrays, language data records are created. Two-character words are preferably represented with data records having the format shown in FIG. 7 and accessed using an array of offsets. Data records corresponding to words having more than two characters preferably have the format shown in FIG. 5. These data records are used to replace input Pinyin syllables entered by a user with corresponding Chinese text Hanzi characters. As those skilled in the art will appreciate, user inputs of Pinyin syllables may be replaced with Bopomofo syllables on a display, and then converted to Chinese Hanzi characters as text input. In most implementations, the arrays and data records are generated and made available by a language data source, such as a provider of a text input software application or module, and installed on an electronic device. A user of such a device thereby installs previously generated language data on the device without having to first generate the language data.

The language data described above simplifies input of Chinese text for which data records exist. According to a further embodiment of the present invention, new words, phrases and sentences added by a user are stored. When a user commits an inputted Pinyin sequence, the sequence is segmented and converted into a sequence of Chinese text Hanzi syllables, using the above data records, for display to a user. When the Chinese text is displayed, the user may change the candidates if different input text was intended, by invoking a lookup function based on any part of the sequence, for example. Where the user has changed the candidates for the sequence of Pinyins after the conversion, new words with the changed candidates are formed and added to the language data, as described in further detail below.

For example, where the user inputs the Pinyin sequence "zhu4 ni3 hao3yun4", the sequence may be segmented as zhu4/ni3/hao3yun4, which corresponds to the Chinese text "˙好. The Chinese character ˙ is first candidate of the Pinyin syllable "zhu4". If the user changes the candidate for the first Pinyin from ˙ to 祝, where 祝 is the fourth candidate of the Pinyin "zhu4", a new word is formed and added to the language data.

The particular new word formed when a user changes a candidate is dependent upon the position of the candidate in an input sequence. If the candidate selected by the user is the first word in a sequence, then the next word in the sequence is added to the first word and the new word results from unifying the two. In the above example, the candidate for the first Pinyin is changed by the user, so the second Pinyin in the sequence is added to the first Pinyin to form the new word, and a data record for the new word is added to the language data. The candidate for the first Pinyin in the new word is the selected candidate.

Similarly, where the candidate selected by the user corresponds to the last word in a sequence, the previous word is added to the last word and the new word results from unifying the two. If the candidate selected by the user corresponds to an intermediate word between two other words, two new words are formed by adding the preceding word to the intermediate word and adding the subsequent word to the intermediate word. The two new words are then added to the language data.

Figure 9:
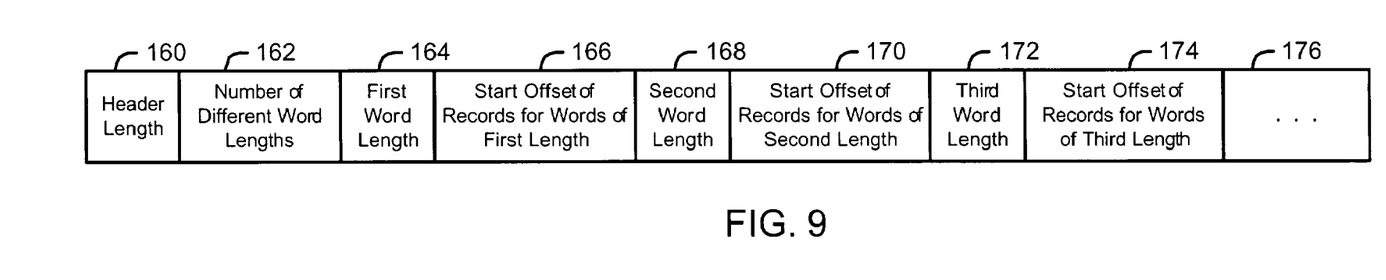
FIG. 9 shows a block diagram of a learning language data header.

The user input patterns are stored in learning language data, which preferably includes a learning language data header and a learning language data array. FIG. 9 shows a block diagram of a learning language data header format, FIG. 10 shows a block diagram of an example learning language data header, and FIG. 11 is a block diagram showing a learning language data array.

Learning language data may include data records for Chinese words of varying lengths. The language data header shown in FIG. 9 includes information about the lengths words for which data records are stored in the learning language data, and the locations of these data records in the learning language data. The header length entry 160 is the length of the header itself, including the header length entry. The next entry 162 is the number of different word lengths for which data records exist in the learning language data array, described in further detail below. For example, if the learning language data includes data records for two-character and five-character words, then entry 162 is 2.

The remainder of the learning language data header comprises pairs of word lengths and offsets. The number of pairs corresponds to the number of different word lengths in the header entry 162. Three such pairs 164/166, 168/170, and 172/174 are shown in the header of FIG. 9. Where data records for more than three different word lengths are stored in the learning language data, the learning language data header includes further pairs, generally designated 176. Each pair includes a word length entry 164, 168, or 172, indicating a particular length of words for which data records exist in the learning language data, and an offset entry 166, 170, or 174, indicating the offset of the first data record, in the learning language data array, for words of the length indicated in the preceding word length entry.

Figure 10:
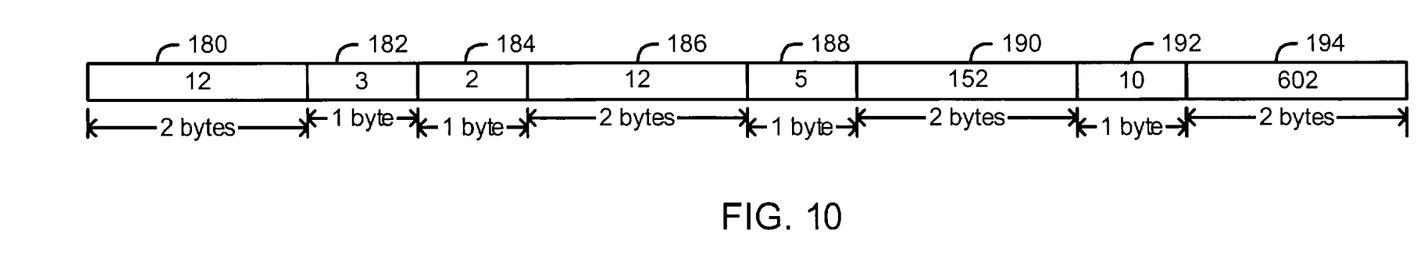
FIG. 10 shows a block diagram of an example learning language data header.
Figure 11:
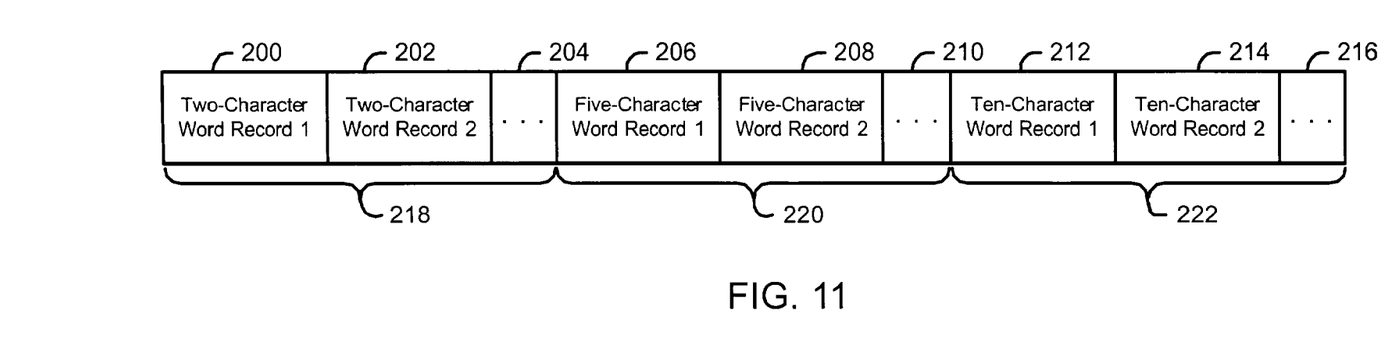
FIG. 11 is a block diagram showing a learning language data array.

The example learning language data header in FIG. 10 includes a two-byte header length entry 180, a one-byte word length number entry 182, and three pairs of one-byte word length entries and two-byte offset entries 184/186, 188/190, and 192/194. The length of a learning language header and any entry therein is in no way restricted to the lengths shown in FIG. 10. Overall length of a header is dependent upon the associated learning language data array, and may change as new words are added to the learning language data array, where a data record for a new word having a different length than the words for which data records exist is added to the learning language data array, for example. The content of the header of FIG. 10 is described in further detail below, in conjunction with the learning language data array shown in FIG. 11.

The learning language data array in FIG. 11 includes an array of two-character words 218, an array of five-character words 220, and an array of ten-character words 222. Each of these arrays in the learning language data array includes a series of records 200–204, 206–210, and 212–216. It should be appreciated that learning language data arrays are dependent upon user inputs and may therefore be different for different users and electronic devices. A learning language data array may include data records for fewer, further, or different word lengths than those shown in FIG. 11.

Referring now to both FIGS. 10 and 11, the header length entry indicates that the header is 12 bytes long. As shown in the word length number entry 182, the corresponding language data array includes data records for 3 different lengths of words. The first word length is two characters, as indicated by the word length entry 184, and the first data record 200 for a two-character word has an offset of 12 in the learning language data array, as shown at 200. Although the learning language data is shown separately in FIG. 11 in order to avoid congestion in the drawings, it should be appreciated that the 12-byte learning language data header preferably precedes the learning language data array in the learning language data. It should also be apparent that, for the purposes of illustration, it is assumed that the learning language data header and array are stored as a plurality of one-byte entries in a memory, such that the record 200 is actually the thirteenth entry in the learning language data, offset from the first entry of the learning language data (i.e., the first header length byte) by 12 entries.

The learning language data array also includes data records for 5-character words, indicated in the word length entry 188, starting at offset 152 in the learning language data array. Where two-character words are stored in a 5-byte dedicated format as described above, the 140 entries between the first two-character word data record 200 at offset 12 and the first five-character word data record 206 at offset 152 accommodate 28 data records.

The word length and offset entries 192 and 194 indicate that data records for ten-character words begin at an offset of 625 in the learning language data array. If the data record format in FIG. 5 is used for five-character words, with two bytes per index/tone pair per syllable and one byte per candidate index, then each data record is 15 bytes, and there are 30 such 15-byte data records for five-character words in the learning language data array, occupying offsets 152 through 601. The remainder of the learning language data array following the entry 212 at offset 625, stores data records for ten-character words.

The preceding description and the examples of learning language data shown in FIGS. 10 and 11 assume that the language data array is accessible using offsets of a whole number of bytes. However, other access mechanisms are also possible, where the learning language data header stores indexes, addresses, or other pointers to the learning language data array.

Figure 12:
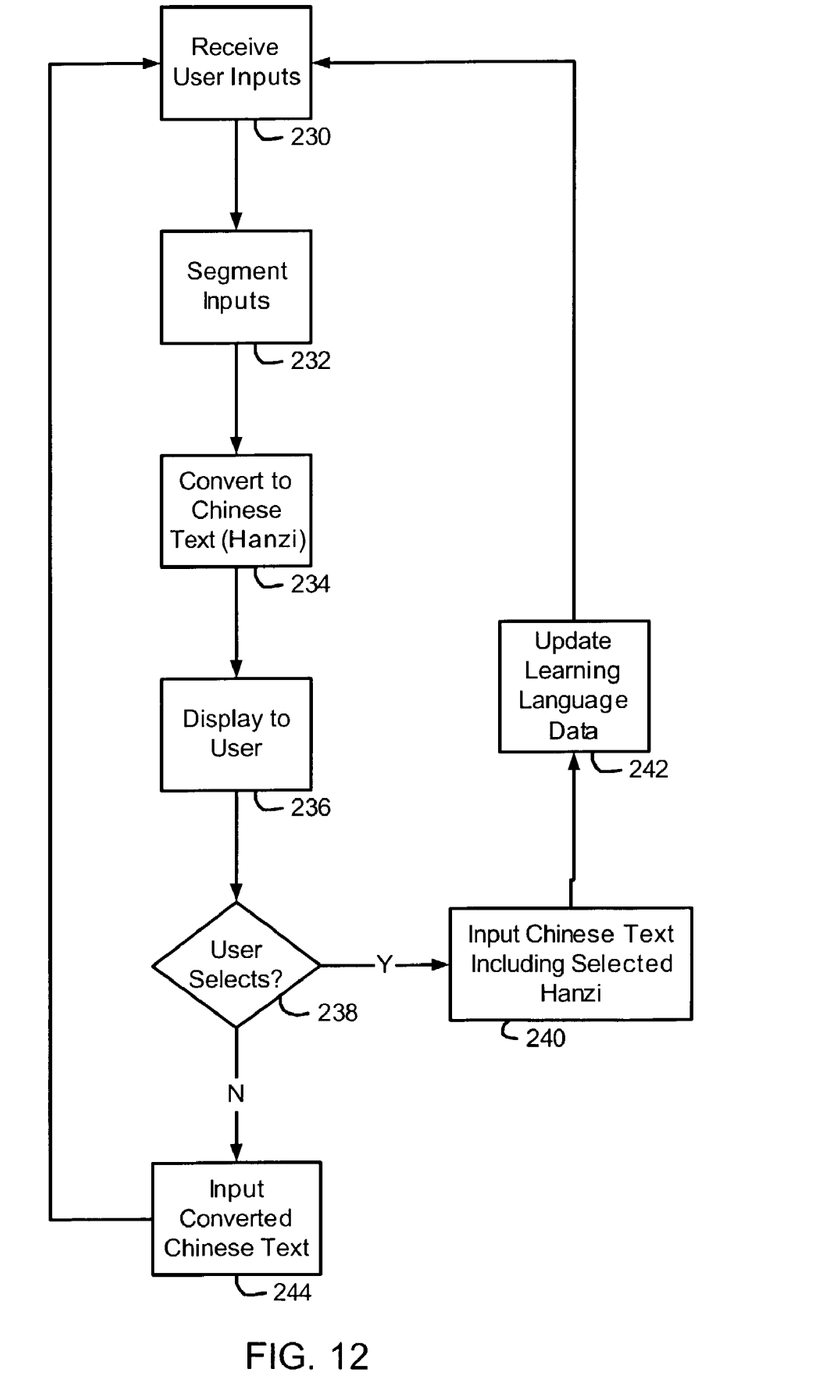
FIG. 12 is a flow diagram of a method of using language data.

Various components of the language data are described above. Use of language data during text input is described in further detail below. FIG. 12 is a flow diagram of a method of using language data.

The method begins at step 230 where user inputs are received and buffered. As those skilled in the art will appreciate, user inputs for Chinese text are typically in the form of Pinyin syllables. The received user input sequence is segmented into words at step 232 and converted into corresponding Chinese text at step 234. Those skilled in the art will also appreciate that input Pinyin syllables may also be replaced with corresponding Bopomofo syllables on a display before the inputs are converted into Chinese text. The conversion at step 234 involves searching the language data, including learning language data if available, for each word, and replacing the input Pinyin sequence, and displayed Bopomofo sequence if applicable, with the Hanzi candidates identified in a corresponding data record in the language data.

At step 236, the converted Chinese text, comprising the Hanzi candidates, is displayed to a user at a current text entry position on a text input screen, and preferably replaces the input Pinyins or displayed Bopomofos. It is then determined, at step 238, whether the user has changed any of the Hanzi candidates, by invoking and choosing from a lookup window, for example. The method proceeds at step 244 to input the converted Chinese text into the electronic device in conjunction with which the method is implemented, and then to receive further inputs from the user at step 230 where the user has not changed any of the candidates. The further user inputs are then segmented and converted as described above to input new words.

Where it is determined at step 238 that the user has changed a candidate, the sequence of candidates including the selected candidate is input to the electronic device and replaces the currently displayed candidate sequence corresponding to the input Pinyin sequence on the input screen. In order to provide for learning as described above, one or more new words are formed as described above, and learning language data is updated at step 242 with the new word or words.

Figure 13:
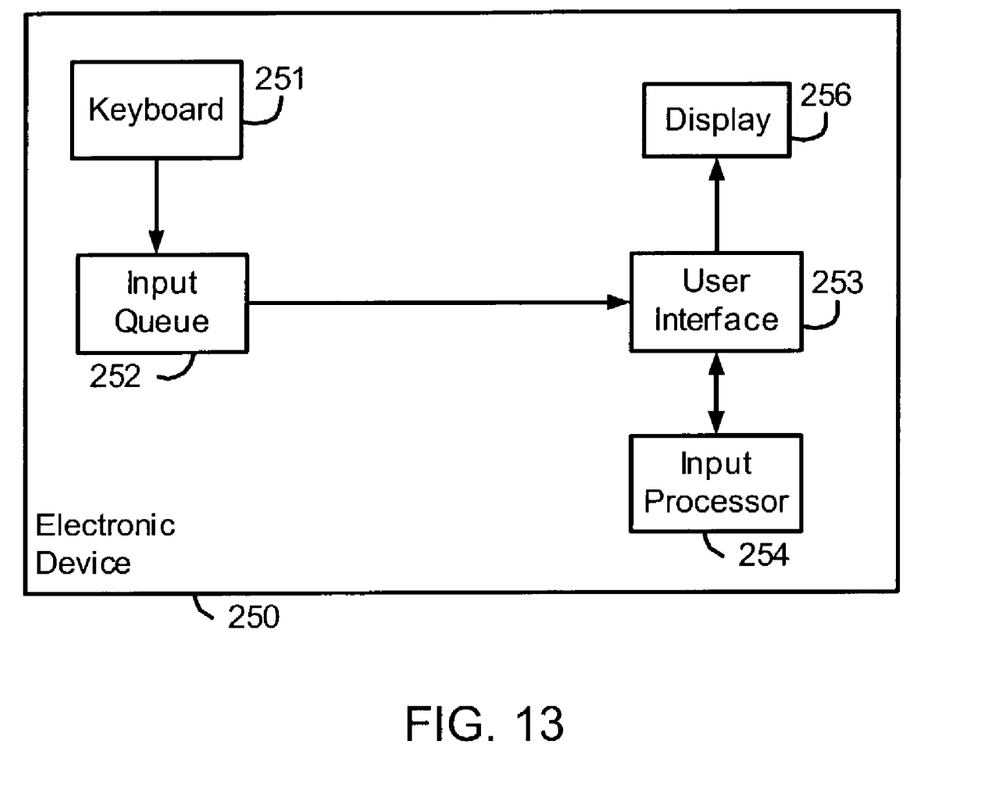
FIG. 13 is a block diagram of a system of using language data.

FIG. 13 is a block diagram of a system of using language data. The system of FIG. 13 includes a keyboard 251, an input queue 252, a user interface 253, an input processor 254, and a display 256, all implemented in an electronic device 250.

The keyboard 251 in most implementations includes keys which represent characters used for input of Pinyin syllables, and may be a full alphanumeric keyboard such as a QWERTY or DVORAK keyboard, a telephone keypad, or some other type of keyboard or keypad. However, it should be appreciated that the keyboard 251 may instead be a graphical interface which supports user input through a touch screen, or handwriting using a stylus, for example. In the electronic device 250, user inputs from the keyboard 251 are received and buffered by the input queue 252.

The user interface 253 provides an interface to the user of the electronic device 250. It accepts inputs from the user via the keyboard 251, and also provides outputs to the user via the display 256. The user interface 253 displays, for example, a text input screen for composing text on the display screen 156.

The input processor 254 receives buffered Pinyin inputs from the input queue 252, through the user interface 253. The input processor 254 segments the inputs into words and identifies Chinese text candidates based on the segmented inputs. These identified candidates are then displayed on the display 256. The input processor 254 accesses the above arrays and language data records as necessary when Chinese text is being input to the electronic device 250. Where the system of FIG. 13 supports learning, then the input processor 254 also accesses and stores learning language data records.

In FIG. 13, the arrays and data records are stored in the input processor 254, incorporated as part of software code implementing the input processor 254, for example. Alternatively, the arrays and data records are stored in a buffer or memory in, or at least accessible to, the input processor 254. Such a memory comprises one or more data stores and is implemented using one or more types of storage component. Electronic devices such as 250 typically include both writeable memory, Random Access Memory (RAM) for example, and Read Only Memory (ROM), from which data may only be read. Writeable memory may be either volatile or non-volatile, although non-volatile memory such as Flash RAM or battery backed-up RAM is preferred when any data in the writeable memory should be maintained in the event of loss of power. Since the arrays and language data records are not typically changed once established, they are preferably stored in non-volatile memory, which need not be a writeable memory. Learning language data records are preferably stored in non-volatile writeable memory, since new learning language data records are added when learning is enabled.

In a preferred embodiment, the input processor 254 is implemented as a software application or a software module configured to operate in conjunction with one or more software applications on the electronic device 250 to enable Chinese text input for processing by such software applications.

The display 256 provides visual data output to a user of the electronic device 250. In portable electronic devices, for example, liquid crystal displays are often used.

User inputs for entering Chinese text on the electronic device 250 are made by depressing keys on the reduced keyboard 251. Text entry may be invoked by the user, for example, by starting a particular software application, module, or utility, using a particular function supported on the electronic device 250. Whenever an operation or function requires input of Chinese text, the Chinese text input system processes user Pinyin inputs to predict correct Chinese syllables. Where more than one software application supports text input, for example, the Chinese text input system is preferably implemented as a software module or utility that can be called or invoked by any of the software applications. Alternatively, each such software application may incorporate software instructions to perform Chinese text input as described herein.

As will be apparent, the user interface 253 presents a text entry screen on the display 256 to aid in text entry. The particular content and formatting of the text entry screen is dependent, for example, upon the nature of the text being entered, the function for which text is being entered, or the software application currently in use. Pinyins are initially displayed on the text entry screen, and may subsequently be replaced with corresponding Bopomofos. As the input Pinyins are segmented and converted into Chinese text, Hanzi character candidates identified by the text entry system or selected by the user are replaced with Hanzi characters.

When user Pinyin inputs have been received, the input processor 254 segments and converts the Pinyin inputs into Chinese text, by searching language data records, and learning language data records if they exist. As described above, the Pinyins input by the user are displayed on the display 256, and replaced with Chinese text after the Pinyins have been segmented and converted. When a candidate Hanzi character in the Chinese text is changed by the user, the input processor 254 replaces the candidate with the selected candidate on the text entry screen on the display 256, and adds one or more new words to learning language data where learning is enabled. User selection of a candidate may be accomplished, for example, by invoking a lookup function based on a sequence of user inputs and using navigation keys on the keyboard 251, or an auxiliary input device (not shown) such as a thumbwheel, to select from a list of candidates corresponding to the sequence of inputs. In one embodiment, when the lookup function is invoked, the Pinyins input by the user, or the corresponding Bopomofos are preferably displayed, either in the text input screen or a lookup window, and the user selects the input sequence or any part thereof on which the lookup function should be based. The user then selects from one or more Hanzi variants for the input sequence, and the selected variant replaces the input sequence in the text input screen on the display 256.

Although the above description refers to functions performed by the input processor 254, it will be appreciated by those skilled in the art that these functions of the input processor 254 are directed by software instructions in a software application, module, or utility in which a Chinese text input method is implemented.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described.

What is claimed as the invention is:

1. A computer-readable medium comprising a language data structure for use in converting Chinese Pinyin syllables stored on the computer-readable medium into Chinese Hanzi characters stored on the computer-readable medium, the data structure comprising:

a plurality of Hanzi character candidate lists, each list comprising Hanzi character candidates associated with a Pinyin syllable, and each Hanzi character candidate in each list having an index in the list; and a plurality of language data records, each language data record corresponding to a word having a plurality of Pinyin syllables and comprising a key and a value, wherein the key in each language data record comprises a sequence of indexes and tone information for the Pinyin syllables of the word to which the language data record corresponds, and wherein the value in each language data record comprises a sequence of indexes of Hanzi character candidates, in the lists of candidates respectfully associated with the Pinyin syllables of the word, that represent the Pinyin syllables of the word.

2. The computer-readable medium of claim 1, wherein each data record is a whole number of bytes in length.

3. The computer-readable medium of claim 1, wherein the index and tone information for each Pinyin syllable are stored in two bytes in a data record.

4. The computer-readable medium of claim 3, wherein the index is 10 bits in length, and wherein the tone information is 5 bits in length.

5. The computer-readable medium of claim 1, wherein the plurality of language data records are stored in a plurality of arrays, and wherein each array stores language data records corresponding to words having the same number of Pinyin syllables.

6. The computer-readable medium of claim 5, wherein language data records in each of the plurality of arrays are sorted based on a first index in the sequence of indexes and tone information.

7. The computer-readable medium of claim 1, further comprising an array of Pinyin syllable identifiers associated with Pinyin syllables, wherein the indexes of the Pinyin syllables of the word are indexes, in the array of Pinyin syllable identifiers, of the identifiers respectively associated with the Pinyin syllables of the word.

8. The computer-readable medium of claim 7, wherein each syllable comprises n+1 characters from an alphabet of N characters, and wherein the identifiers are determined according to the following formula:

$$ID=index_0*(N^0)+index_1*(N^1)+ \ldots +index_n*(N^n),$$

where:
$index_0$ is the index of a first character in the syllable,
$index_1$ is the index of a second character in the syllable,
$index_n$ is the index of an (n+1)th character in the syllable, and
N is the total number of the characters used for syllable construction.

9. The computer-readable medium of claim 7, further comprising an array of Chinese Bopomofo syllable identifiers associated with Bopomofo syllables and a correspondence array indicating correspondence between each Pinyin syllable identifier and its corresponding Bopomofo syllable identifier.

10. The computer-readable medium of claim 1, wherein the plurality of data records comprises language data records for two-syllable words, and wherein each language data record for a two-syllable word comprises:

a key comprising an index of a second Pinyin syllable in the two-syllable word and tone information entry for a first Pinyin syllable and the second Pinyin syllable in the two-syllable word; and a value comprising a sequence of indexes of Hanzi character candidates, in the lists of candidates respectfully associated with the first and second Pinyin syllables, that represent the first and second Pinyin syllables.

11. The computer-readable medium of claim 10, wherein the language data records for two-syllable words are stored in a data record array, wherein each of the language data records for two-syllable words is a variant associated with the first Pinyin syllable, wherein variants associated with the same first Pinyin syllable are grouped in the data record array, and wherein the language data structure further comprises an array of offsets, each offset comprising an offset, in the data record array, of a first variant associated with a first Pinyin syllable.

12. A method of creating Chinese language data, comprising the steps of:

generating identifiers for each of a plurality of Chinese Pinyin syllables;

storing the generated identifiers in an array of identifiers, each identifier in the array of identifiers having an array index;

generating a plurality of Hanzi character candidate lists, each list comprising Hanzi character candidates associated with a Pinyin syllable, and each Hanzi character candidate in each list having a candidate index in the list; and for each of a plurality of words having multiple Pinyin syllables, generating a data record comprising a key and a value, wherein the key comprises an array index of the identifier in the array of identifiers for each of the multiple Pinyin syllables and tone information for each of the multiple Pinyin syllables, and wherein the value comprises a candidate index, in the list of candidates associated with each of the multiple Pinyin syllables, of the candidate that represents each of the multiple Pinyin syllables storing each of the data records in a computer-readable medium.

13. The method of claim 12, further comprising the step of sorting the array of identifiers in increasing order of identifier.

14. The method of claim 12, wherein the step of generating a data record comprises the step of generating a data record comprising a key and a value for each of a plurality of two-syllable words, wherein the key comprises an array index of the identifier in the array of identifiers for a second Pinyin syllable in the two-syllable word and tone information for a first Pinyin syllable and the second Pinyin syllable in the two-syllable word, and wherein the value comprises a candidate index, in the list of candidates associated with each of the first and second Pinyin syllables, of the candidate that represents each of the first and second Pinyin syllables.

15. The method of claim 14, further comprising the steps of:
storing the data records for two-syllable words a data record array, wherein data records for two-syllable words having the same first Pinyin syllable are grouped in the data record array; and
generating an array of offsets, each offset comprising an offset, in the data record array, of a first data record associated with a first Pinyin syllable.

16. The method of claim 12, further comprising the step of storing the data records in one of a plurality of data record arrays, wherein each array stores data records corresponding to words having a predetermined number of Pinyin syllables.

17. The method of claim 16, wherein the data records in each of the plurality of data record arrays are sorted based on a first array index in each data record.

* * * * *